June 27, 1961 E. H. FORD 2,989,945
SEAFOOD FARMING APPARATUS
Filed July 27, 1959

INVENTOR
Edwin H. Ford
BY Walter G. Finch
ATTORNEY

United States Patent Office 2,989,945
Patented June 27, 1961

2,989,945
SEAFOOD FARMING APPARATUS
Edwin H. Ford, 215 Dumbarton Road,
Baltimore 12, Md.
Filed July 27, 1959, Ser. No. 829,708
5 Claims. (Cl. 119—4)

This invention relates generally to animal husbandry, and more particularly it pertains to apparatus for growing and maturing mollusks, crustaceans, or the like.

Because of the continuing decline in oyster, clam, and crab harvest, it is becoming necessary to look to ways and means for rehabilitating old growing beds and finding methods for utilizing formerly unsatisfactory areas.

It is common knowledge that best water levels and plentiful food strata are not always compatible with the natural habitat of these animals. Various make-shift devices, such as brush, old sunken barges, and the like have been used in the past but their employment leaves much to be desired in apparatus for scientifically growing shellfish. Some attempts have been made to use hanging devices for attracting spat or collecting small oysters. Fish and lobster pots are, of course, old in the art.

It is a principal object of this invention to provide a novel underwater cultivation rack arrangement in order to furnish a means and technique for easy and efficient commercial cultivation, retrieving, holding, and legally claiming oysters, clams, crabs, fish and the like and to utilize waters having unsatisfactory bottoms or within navigatable waters or for protection against predatory enemies.

Other objects of this invention are to provide a relatively pilfer-proof anchored water-immersed cultivator type tray arrangement having sub-surface suspension and which will not unduly interfere with navigation of boats, ships, or other floatable vessels.

Another object of this invention is to provide a non-fouling rigging for holding and supporting an off-bottom mollusk or crustacean cultivation structure.

And yet another object of this invention is to provide a self-leveling, non-tilting, cultivator type tray holding apparatus for immersion in still or flowing waters for use in the cultivation of mollusks or crustaceans.

Figure 1:
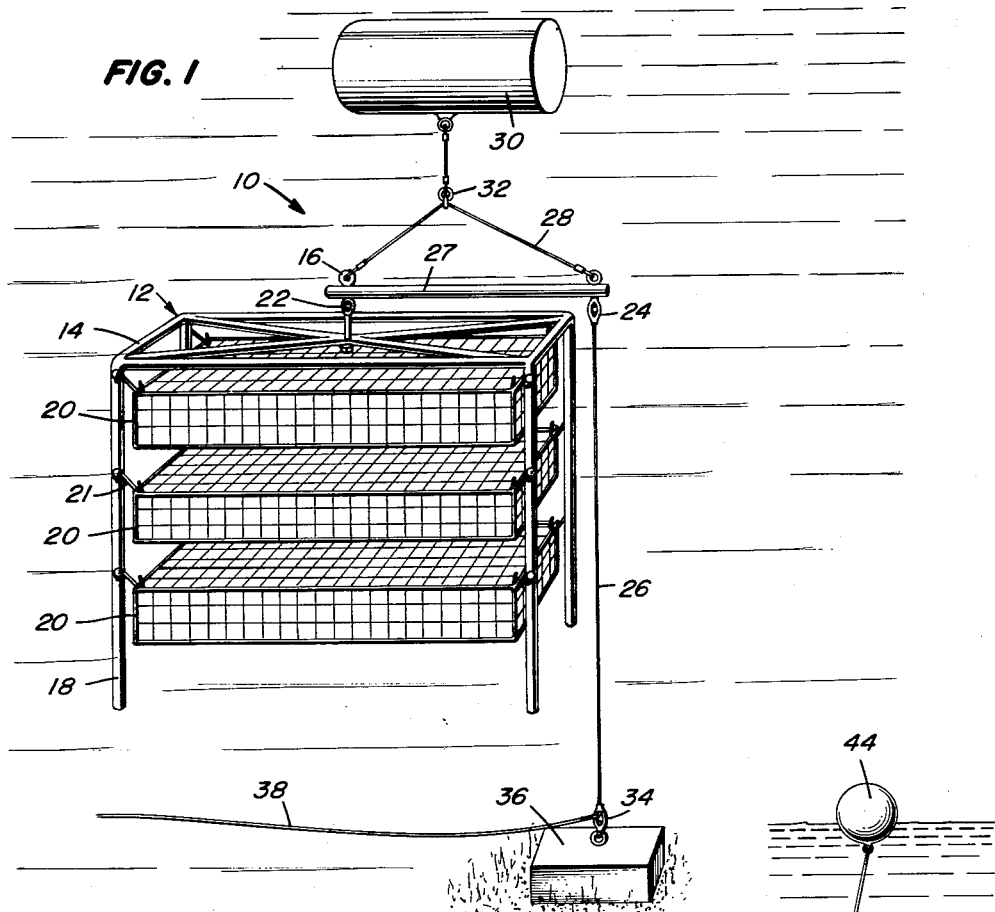
Figure 2:
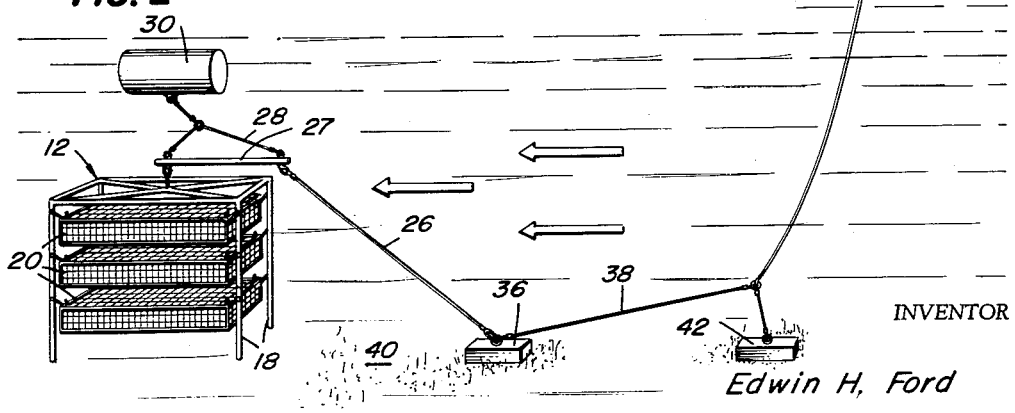

These and other objects and advantages of this invention will become more readily apparent and understood from the accompanying specification and drawings in which:

FIG. 1 is a perspective view of a novel underwater cultivator type tray holding apparatus incorporating features of this invention; and FIG. 2 is a perspective view of the cultivator apparatus of FIG. 1 illustrating the performance and use thereof in heavy tide flow conditions.

Referring now to FIG. 1 of the drawing, there is illustrated generally a cultivator 10, which can be used for growing and maturing oysters, crabs, clams, fish, or equivalent mollusks or crustaceans. The cultivator 10 consists of a metal frame 12 having a cross braced top 14, with a center eyebolt 16.

A plurality of equal length legs 18 depend downwardly from the sides of the top 14 of the frame 12, and they are rigidly fastened thereto. One or more spaced trays 20 are supported by and between the legs 18 by means of supports 21 which may take the form of brackets or hooks as illustrated.

The sides, top, and bottom of trays 20 are made of perforated metal sheet or wire cloth having approximately one inch apertures provided therein and are hinged on at least one edge of each tray 20 for access to the interior thereof. If desirable, the trays 20 can be conventionally slidably mounted between the legs 18 of the frame 12.

A pair of swivels 22 and 24 are secured to the ends of a substantially horizontal cantilever support beam 27. Swivel 22 is attached to the top center eyebolt 16, while the other swivel 24 is secured to an anchor line 26. Cantilever beam 27 is arranged to pivot about eyebolt 16, as best shown in FIGS. 1 and 2.

The ends of the cantilever beam 27 are joined by a stirrup 28, which has an intermediately located fixed eye 32 to which a float 30 is attached. The anchor line 26, in turn is attached by means of a swivel 34 to an anchor 36. A retrieving line 38 is also attached to the anchor 36 so that the cultivator 10 can be retrieved as desired.

The fixed eye 32 for the stirrup 28 is adjusted in position so that with the trays 20 loaded with oyster spat or clutch, or other types of marine animals, the float 30 and anchor 36 hold the frame 12 suspended, with the cantilever beam 27 being positioned substantially horizontal. The anchor line 26 is adjusted in length for the desired bottom clearance of the frame 12. The cantilever beam 27 is made of sufficient length so that the frame 12 may swivel freely under it.

As illustrated in FIG. 2 even under the condition of heavy tide flow as indicated by the arrows, the frame 12 hangs free and unencumbered by the supporting and restraining lines for the float 30 and anchor 36. No excessive tilting of the trays 20 occurs even when the tidal flow is so great as to cause the legs 18 to make contact with the bottom 40. The retrieving line 38 for retrieving the cultivator 10 may be laid along the bottom 40 and brought out at the shore line or attached to another anchor 42 marked with a marker buoy 44.

It is to be reemphasized that the cultivator 10 can be used for growing and maturing fish of all types, oysters, clams, crabs, or similar mollusks or crustaceans. Also, the cultivator 10 can be formed of non-corrosive metal, plastic, or other non-corrosive type materials, with the trays 20 being arranged to be fixed or removable to fit the particular conditions of farming.

While but one construction of the invention has been illustrated in the drawing and described herein, it is not intended to limit the design and manufacture of the cultivator arrangement as proposed to such particular form, as it is appreciated that other structures could be designed and made which would use the same principles and come within the scope of the appended claims.

What is claimed is:

1. A cultivator arrangement for growing and maturing mollusks, crustaceans, or the like, comprising, a substantially horizontal frame, a plurality of spaced members extending downwardly from said frame, a plurality of spaced trays removably mounted between said members and arranged for receiving marine life to be grown and matured, means including a cantilever beam having its free end extending outwardly past said frame and its other opposite end thereof pivotally connected to said frame and constituting a support therefor, an anchor, means for swivelably connecting the free end of said cantilever beam to said anchor, a float, and other means including a stirrup for swivelably connecting said float to said pivoted and free ends of said cantilever beam and forming a rigid structure, said cantilever arrangement thus being arranged to be suspended below the upper and lower surfaces of a body of water.

2. A cultivator arrangement for growing and maturing mollusks, crustaceans, or the like, comprising, a frame having a substantially horizontal cross braced top, a plurality of spaced members secured to said frame and extending downwardly therefrom, a plurality of spaced trays removably mounted between said members and arranged for receiving marine life to be grown and matured, a cantilever beam having a free end extending above and outwardly from said frame, means for pivotally mounting the opposite end of said cantilever beam to the top of said frame, an anchor, means including a swivel for swivelably connecting the outwardly extending free end of said cantilever beam to said anchor, and other means including a float, and a stirrup having a swivel for swivelably connecting the float to the pivoted and free ends of said cantilever beam, with said stirrup and cantilever beam forming a rigid structure.

3. A cultivator arrangement as recited in claim 2, and additionally means for removably mounting each said tray between said members.

4. A cultivator arrangement as recited in claim 2, wherein said means for pivotally mounting the one end of said cantilever beam to said frame includes an eyebolt and swivel arrangement.

5. A cultivator arrangement as recited in claim 2, and additionally means connected to said anchor for retrieving said anchor and cultivator arrangement.

References Cited in the file of this patent

UNITED STATES PATENTS

| 1,815,521 | Miyagi | July 21, 1931 |

FOREIGN PATENTS

| 855,799 | France | Feb. 26, 1940 |
| 157,219 | Australia | June 24, 1954 |
| 1,184,250 | France | Feb. 2, 1959 |